US012809086B2

(12) United States Patent
Suganuma et al.

(10) Patent No.: US 12,809,086 B2
(45) Date of Patent: Nov. 24, 2026

(54) FIBER FUSION SPLICER AND FIBER FUSION SPLICING METHOD

(71) Applicant: SUMITOMO ELECTRIC INDUSTRIES, LTD., Osaka (JP)

(72) Inventors: Takahiro Suganuma, Osaka (JP); Takemi Hasegawa, Osaka (JP); Kazunobu Kakuta, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 288 days.

(21) Appl. No.: 18/850,105

(22) PCT Filed: Mar. 17, 2023

(86) PCT No.: PCT/JP2023/010669

§ 371 (c)(1),
(2) Date: Sep. 24, 2024

(87) PCT Pub. No.: WO2023/182224

PCT Pub. Date: Sep. 28, 2023

(65) Prior Publication Data

US 2025/0216610 A1 Jul. 3, 2025

(30) Foreign Application Priority Data

Mar. 25, 2022 (JP) ................................ 2022-049563

(51) Int. Cl.
*G02B 6/255* (2006.01)

(52) U.S. Cl.
CPC ......... *G02B 6/2553* (2013.01); *G02B 6/2551* (2013.01); *G02B 6/2555* (2013.01)

(58) Field of Classification Search
CPC ................ G02B 6/2553; G02B 6/2551; G02B 6/2555
See application file for complete search history.

(56) References Cited

U.S. PATENT DOCUMENTS

| | | | | | |
|---|---|---|---|---|---|
| 6,966,708 | B2 * | 11/2005 | Hattori | G02B 6/2551 | 385/95 |
| 7,494,288 | B2 * | 2/2009 | Ozawa | G02B 6/2551 | 385/98 |
| 7,900,480 | B2 * | 3/2011 | Hattori | G02B 6/2551 | 65/378 |

(Continued)

FOREIGN PATENT DOCUMENTS

| | | |
|---|---|---|
| CN | 102520509 A | 6/2012 |
| CN | 107132618 A | 9/2017 |

(Continued)

*Primary Examiner* — Tina Wong

(74) *Attorney, Agent, or Firm* — McDonald Hopkins LLC

(57) ABSTRACT

A fiber fusion splicing device according to an embodiment obtains an end face observation image for facilitating position identification of constituent elements having different refractive indexes on a fiber end face. This fiber fusion splicing device comprises: a drive mechanism that includes stages that define the positions and rotation angles of first and second MCFs; an imaging device that captures images of the end faces of the first and second MCFs; first illumination devices that irradiate coatings of the first and second MCFs with lateral observation light; second illumination devices that are disposed spaced away from the first and second MCFs and irradiate the respective tip portions of the first and second MCFs, where a portion of the coatings have been removed, with end section observation light; and a heating device that heats the end faces of the first and second MCFs.

6 Claims, 5 Drawing Sheets

(56) References Cited

U.S. PATENT DOCUMENTS

| | | | | |
|---|---|---|---|---|
| 8,011,835 | B2 * | 9/2011 | Contag | G01M 11/37 385/96 |
| 10,054,742 | B2 * | 8/2018 | Sato | G02B 6/2553 |
| 10,365,437 | B2 * | 7/2019 | Akiyama | H05H 1/36 |
| 2002/0159724 | A1 * | 10/2002 | Oki | G02B 6/2551 385/11 |
| 2004/0190838 | A1 * | 9/2004 | Bush | G02B 6/2555 385/96 |
| 2004/0218878 | A1 * | 11/2004 | Takahashi | G02B 6/2551 385/99 |
| 2005/0041939 | A1 * | 2/2005 | Saito | G02B 6/2551 385/96 |
| 2006/0280417 | A1 * | 12/2006 | Sato | G02B 6/2553 385/134 |
| 2013/0298610 | A1 | 11/2013 | Sasaki et al. | |
| 2015/0055923 | A1 | 2/2015 | Saito et al. | |
| 2022/0066091 | A1 | 3/2022 | Hayashi et al. | |

FOREIGN PATENT DOCUMENTS

| | | | |
|---|---|---|---|
| CN | 109471223 | A | 3/2019 |
| FR | 2557981 | A1 | 7/1985 |
| JP | S61-029806 | A | 2/1986 |
| JP | 2004-151178 | A | 5/2004 |
| JP | 2013-050695 | A | 3/2013 |
| JP | 2017-021190 | A | 1/2017 |
| JP | 2018-004685 | A | 1/2018 |
| JP | 2022-041625 | A | 3/2022 |
| WO | 2012/101736 | A1 | 8/2012 |
| WO | 2013/058143 | A1 | 4/2013 |

* cited by examiner

FIBER FUSION SPLICER AND FIBER FUSION SPLICING METHOD

TECHNICAL FIELD

The present disclosure relates to a fiber fusion splicer and a fiber fusion splicing method. This application claims priority based on Japanese Patent Application No. 2022-049563 filed on Mar. 25, 2022, and the entire contents of the Japanese patent application are incorporated herein by reference.

BACKGROUND ART

As a fiber fusion splicing method, Patent Literature 1 discloses an example of a method for splicing multi-core optical fibers (hereinafter referred to as "MCF"). In general, the MCF has a plurality of cores disposed away from the central axis. Therefore, when fusion-splicing two MCFs, it is necessary to align all core positions in each of the two MCFs to be fusion-spliced, and specifically, in addition to alignment in directions along the X-axis and the Y-axis orthogonal to the Z-axis along the longitudinal direction of each MCF, rotational alignment around the Z-axis (hereinafter, referred to as "θ alignment") is necessary. As the θ alignment method, a side observation method and an end face observation method are known. In the side observation method, side observation images of two MCFs are acquired, at least one of the MCFs is rotated around the Z-axis, and the two MCFs are aligned at an angle at which the degree of coincidence between the side observation images of the two MCFs is maximized. In the end face observation method, end face observation images of two MCFs are acquired, and the two MCFs are aligned so that the core positions between the acquired end face observation images coincide with each other.

CITATION LIST

Patent Literature

Patent literature 1: Japanese Unexamined Patent Application Publication No. 2013-050695

SUMMARY OF INVENTION

A fiber fusion splicer of the present disclosure is a device for fusion splicing first and second MCFs each having a glass portion and a coating surrounding an outer periphery of the glass portion. The glass portion is substantially a glass optical fiber and has a plurality of cores and a common cladding surrounding the plurality of cores. The coating of each of the first and second MCFs is partially removed to expose a tip portion of the glass portion including an end face. The fiber fusion splicer, as an aspect thereof, includes a driving mechanism, an imaging device, a first illumination device, a second illumination device, and a heating device. The driving mechanism includes a first stage and a second stage. The first stage defines a position and a rotation angle of the end face of the first MCF while holding the first MCF. The second stage defines a position and a rotation angle of the end face of the second MCF while holding the second MCF. The imaging device is configured to capture an image of each of the end faces of the first and second MCFs. The first illumination device is a device that emits observation light for lateral observation to the respective coatings of the first and second MCF and includes a first side irradiation light source and a second side irradiation light source. The first side irradiation light source is configured to emit first side observation light to the coating of the first MCF. The second side irradiation light source is configured to emit second side observation light to the coating of the second MCF. The second illumination device is a device that emits the tip portion of each of the first and second MCFs with observation light for end observation and includes a first end irradiation light source and a second end irradiation light source. The first end irradiation light source is disposed away from the first MCF and is configured to emit first end observation light to the tip portion of the first MCF from which the coating is partially removed. The second end irradiation light source is disposed away from the second MCF and is configured to emit second end observation light to the tip portion of the second MCF from which the coating is partially removed. The heating device is configured to heat the end faces of the first and second MCFs to melt the end faces of the first and second MCFs with the end faces of the first and second MCFs butted against each other.

DETAILED DESCRIPTION

Figure 1:
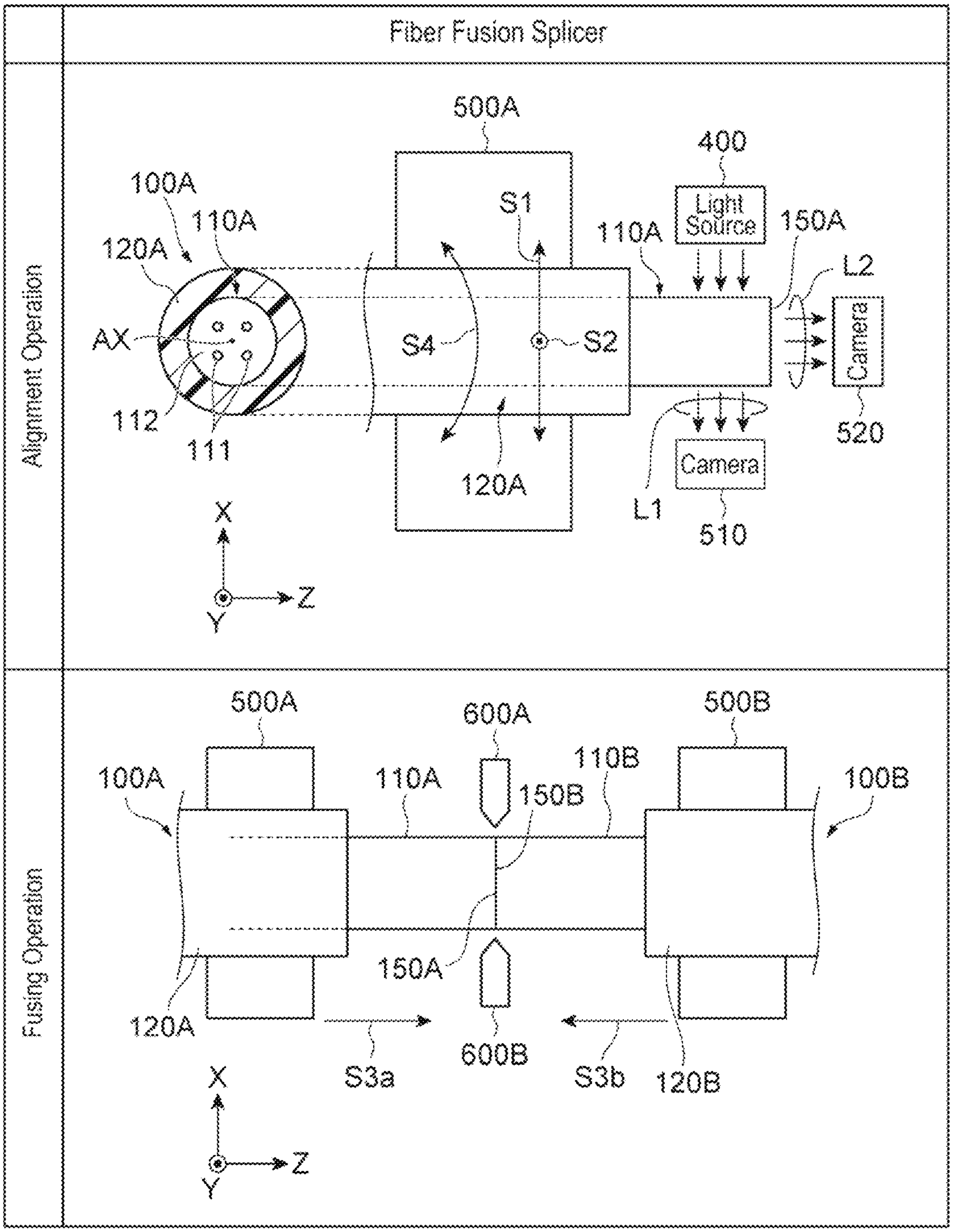
FIG. 1 is a diagram for explaining a general fiber fusion splicer and a general fiber fusion splicing method which are common to the fiber fusion splicer and the fiber fusion splicing method of the present disclosure except for an irradiation method for observation light.

Problems to be Solved by Present Disclosure

The inventors have studied the above-described conventional techniques and have found the following problems. That is, in the conventional fiber fusion splicing method, illumination light as observation light for obtaining an end face observation image is made incident from the side of an optical fiber to be spliced, and is propagated through the optical fiber for a certain distance. However, there is a problem that light propagating through a structure other than the core in the fiber, for example, a cladding or the like, is greatly attenuated, and sufficient luminance cannot be obtained at the end face. Therefore, in the case where it is necessary to grasp the relative position of the core with respect to the outer diameter of the optical fiber, the outer periphery of the optical fiber, that is, the cladding outer periphery cannot be recognized, and as a result, the relative position of the core in the optical fiber to be connected cannot be specified. Furthermore, when the coating of the optical fiber is colored, the observation light is absorbed by the ink depending on the combination of the wavelength of the observation light and the light absorption characteristics of the colored ink, and a sufficient amount of observation light is not introduced into the optical fiber, and thus, there is a problem that an end face observation image of the optical fiber to be connected including the core and the cladding cannot be obtained.

In another fiber fusion splicing method, observation light for obtaining an end face observation image is directly emitted into an optical fiber to be spliced. However, in this method, it is difficult to obtain a luminance change reflecting the refractive index distribution in the fiber end face from the end face observation image, and it is difficult to specify the position of the configuration element such as the core with respect to the outer periphery of the optical fiber.

The present disclosure has been made to solve the above-described problems, and an object of the present disclosure is to provide a fiber fusion splicer and a fiber fusion splicing method, the fiber fusion splicer having a structure for obtaining an image of a fiber end face that facilitates specifying the positions of configuration elements having different refractive indices in the fiber end face.

Advantageous Effects of Present Disclosure

According to the fiber fusion splicer and the fiber fusion splicing method of the present disclosure, as an image of the fiber end face of each MCF necessary for alignment before fusion splicing between two MCFs, an image that facilitates identification of the positions of configuration elements having different refractive indices in the fiber end face is obtained.

DESCRIPTION OF EMBODIMENTS OF PRESENT DISCLOSURE

First, the contents of embodiments of the present disclosure will be described by listing them individually.

(1) A fiber fusion splicer of the present disclosure is a device for fusion splicing first and second MCFs each having a glass portion which corresponds to a glass optical fiber and a coating surrounding an outer periphery of the glass portion. The glass portion is substantially a glass optical fiber and has a plurality of cores and a common cladding surrounding the plurality of cores. The coating of each of the first and second MCFs is partially removed to expose a tip portion of the glass portion including an end face. The fiber fusion splicer includes a driving mechanism, an imaging device, a first illumination device, a second illumination device, and a heating device. The driving mechanism includes a first stage and a second stage. The first stage defines a position and a rotation angle of the end face of the first MCF while holding the first MCF. The second stage defines a position and a rotation angle of the end face of the second MCF while holding the second MCF. The imaging device is configured to capture an image of each of the end faces of the first and second MCFs. The first illumination device is a device that emits observation light for lateral observation to the respective coatings of the first and second MCF and includes a first side irradiation light source and a second side irradiation light source. The first side irradiation light source is configured to emit first side observation light to the coating of the first MCF. The second side irradiation light source is configured to emit second side observation light to the coating of the second MCF The second illumination device is a device that emits observation light for end observation to the tip portion of each of the first and second MCFs and includes a first end irradiation light source and a second end irradiation light source. The tip portion of each of the first and second MCF corresponds to the glass portion from which the coating is removed. The first end irradiation light source is disposed away from the first MCF and is configured to emit first end observation light to the tip portion of the first MCF from which the coating is partially removed. The second end irradiation light source is disposed away from the second MCF and is configured to emit second end observation light to the tip portion of the second MCF from which the coating is partially removed. The heating device configured to heat the end faces of the first and second MCFs to melt the end faces of the first and second MCFs with the end faces of the first and second MCFs butted against each other. The glass portion corresponds to a glass optical fiber included in the MCF.

As described above, the fiber fusion splicer of the present disclosure includes a first illumination device and a second illumination device for enabling both side observation and end observation for the first MCF and the second MCF before fusion, respectively. With this configuration, the contrast between the core and the cladding and the contrast between the cladding and the image background are clear in the images of the end faces of the first MCF and the second MCF, and thus the positions of the configuration elements having different refractive indexes in the fiber end face can be easily specified.

(2) In the above (1), in the first illumination device, the first side irradiation light source may be disposed to come into contact with the first MCF with a microbend occurring in the coating of the first MCF. The second side irradiation light source may be disposed to come into contact with the second MCF with a microbend occurring in the coating of the second MCF. This configuration allows the first side observation light and the second side observation light to be efficiently introduced into the corresponding first MCF and second MCF, specifically into the core and the common cladding.

(3) In the above (1), the driving mechanism may further include a first bending stage and a second bending stage, the first bending stage being configured to form a bend in a section of the first MCF, the section being covered with the coating of the first MCF, the second bending stage being configured to form a bend in a section of the second MCF, the section being covered with the coating of the second MCF. Thus, the bending state in the coated parts of the first MCF and the second MCF can be maintained. In the first illumination device, the first side irradiation light source may be disposed away from the first MCF to emit the first side observation light to the section of the first MCF in which the bend is formed. The second side irradiation light source may be disposed away from the second MCF to emit the second side observation light to the section of the second MCF in which the bend is formed. This configuration also allows the first side observation light and the second side observation light to be efficiently introduced into the corresponding first MCF and second MCF, specifically into both the core and the common cladding.

(4) A fiber fusion splicing method of the present disclosure is a method for fusion splicing first and second MCFs each having a glass portion and a coating surrounding an outer periphery of the glass portion. The glass portion is substantially a glass optical fiber and has a plurality of cores and a common cladding surrounding the plurality of cores. The coating of each of the first and second MCFs is partially removed to expose a tip portion of the glass portion including an end face. The fiber fusion splicing method includes, as an aspect thereof, a preparation step, a first illumination step, a second illumination step, an imaging step, an alignment step, and a heating step. In the preparation step, the first MCF is placed on a first stage defining a position and a rotation angle of the end face of the first MCF. Similarly, the second MCF is placed on a second stage defining a position and a rotation angle of the end face of the second MCF. In the first illumination step, the coating of the first MCF is irradiated with first side observation light from a first side irradiation light source. Similarly, the coating of the second MCF is irradiated with second side observation light from a second side irradiation light source. In the second illumination step, the tip portion of the first MCF from which the coating is partially removed is irradiated with first end observation light from a first end irradiation light source disposed away from the first MCF. Similarly, the tip portion of the second MCF from which the coating is partially removed is irradiated with second end observation light from a second end irradiation light source disposed away from the second MCF. In the imaging step, an image of each of the end faces of the first and second MCFs is captured. In the alignment step, the positions and the rotation angles of the end faces of the first and second MCFs are adjusted to make positions of the plurality of cores in the captured image of the end face of the first MCF match positions of the plurality of cores in the captured image of the end face of the second MCFs. In the heating step, the end faces of the first and second MCFs are heated to melt the end faces of the first and second MCFs with the end faces of the aligned first and second MCFs butted against each other.

As described above, in the fiber fusion splicing method of the present disclosure, the first MCF and the second MCF before fusion are irradiated with the side observation light and the end observation light for enabling both side observation and end observation. With this configuration, the contrast between the core and the cladding and the contrast between the cladding and the image background are clear in the images of the end faces of the first MCF and the second MCF, and thus the positions of the configuration elements having different refractive indexes in the fiber end face can be easily specified.

(5) In the above (4), in the first illumination step, the first side irradiation light source may be disposed to come into contact with the first MCF with a microbend occurring in the coating of the first MCF. The second side irradiation light source may be disposed to come into contact with the second MCF with a microbend occurring in the coating of the second MCF. This configuration allows the first side observation light and the second side observation light to be efficiently introduced into the corresponding first MCF and second MCF, specifically into both the core and the common cladding.

(6) In the above (4), the first illumination device may emit the lateral observation light to the first MCF and the second MCF in which bends are formed. In this case, the first side irradiation light source may be disposed away from the first MCF and may emit the first side observation light to a section of the coating of the first MCF in which a bend is formed. The second side irradiation light source may be disposed away from the second MCF and may emit the second side observation light to a section of the coating of the second MCF in which a bend is formed. This configuration also makes it possible to efficiently introduce the first side observation light and the second side observation light into the corresponding first MCF and second MCF, specifically into both the core and the common cladding.

Each of the aspects listed in the "Description of Embodiments of Present Disclosure" section above is applicable to each of the remaining aspects or to all combinations of these remaining aspects.

DETAILS OF EMBODIMENTS OF PRESENT DISCLOSURE

Hereinafter, specific structures of the fiber fusion splicer and the fiber fusion splicing method of the present disclosure will be described in detail with reference to the accompanying drawings. The present disclosure is not limited to these examples, but is defined by the scope of the claims, and is intended to include all modifications within the meaning and scope equivalent to the scope of the claims. In the description of the drawings, the same elements are denoted by the same reference signs, and redundant description thereof will be omitted.

FIG. 1 is a diagram for explaining a general fiber fusion splicer and a general fiber fusion splicing method which are common to the fiber fusion splicer and the fiber fusion splicing method of the present disclosure except for an irradiation method for observation light, that is, a light source arrangement (in FIG. 1, referred to as a "fiber splicing device"). The upper stage of FIG. 1 (referred to as "alignment operation" in FIG. 1) shows a device configuration for performing the alignment operation. The lower stage of FIG. 1 (referred to as "fusing operation" in FIG. 1) shows a device configuration for performing the fusing operation.

In the upper stage of FIG. 1, as the configuration of the fiber fusion splicer, the device configuration of the near side of a first MCF 100A during the alignment operation, specifically, the partially of the fiber fusion splicer, of first MCF 100A and a second MCF 100B to be fusion-spliced to each other is shown. Since the device configuration on the near side of second MCF 100B is also the same as the device configuration on the near side of first MCF 100A, only the device configuration on first MCF 100A side is shown in the upper stage of FIG. 1.

First MCF 100A includes a glass optical fiber 110A extending along a central axis AX as a glass portion, and a coating 120A covering an outer periphery of glass optical fiber 110A. Glass optical fiber 110A includes a plurality of cores 111 each extending along the central axis and a common cladding 112 surrounding the plurality of cores 111. Coating 120A of first MCF 100A is partially removed so that a tip portion of glass optical fiber 110A including an end face 150A corresponding to a fiber end face is exposed. As shown in the lower stage of FIG. 1, second MCF 100B also includes a glass optical fiber 110B extending along central axis AX as a glass portion and a coating 120B covering the outer periphery of glass optical fiber 110B, and is held by a second stage 500B. Glass optical fiber 110B includes a plurality of cores 111 each extending along the central axis and common cladding 112 surrounding the plurality of cores 111. Coating 120B of second MCF 100B is partially removed so that a tip portion of glass optical fiber 110B including an end face 150B corresponding to a fiber end face is exposed.

As a matter of course, the number of cores of first MCF 100A and the number of cores of second MCF 100B are the same. Both first MCF 100A and second MCF 100B may be provided with a marker having a refractive index different from that of common cladding 112, separately from core 111. Coating 120A and coating 120B are preferably made of resin. Further, coating 120A and coating 120B may contain a pigment or a light scattering material and may have a color under natural light. In any configuration, identification is facilitated when a plurality of MCFs are handled.

In first MCF 100A, a portion of coating 120A is held by a first stage 500A, and first stage 500A defines the position of the tip portion of first MCF 100A along a movement direction S1 parallel to the X-axis and along a movement direction S2 parallel to the Y-axis as partially of the alignment operation. Further, first stage 500A rotates first MCF 100A along a rotation direction S4 about the Z-axis as θ alignment. In addition, in the alignment operation, an observation system for performing at least one of side observation and end face observation on first MCF 100A is further provided. For example, in the case of side observation, a light source 400 and a camera 510 are disposed so as to sandwich first MCF 100A. An observation light L1 emitted from light source 400 passes through first MCF 100A and reaches camera 510. Thus, a side image of first MCF 100A is obtained. In the side observation, light source 400 and camera 510 may be disposed so as to sandwich coating 120A. On the other hand, in the case of the end face observation, an observation light L2 emitted from light source 400 propagates through first MCF 100A and reaches a camera 520. As a result, an image of end face 150A of first MCF 100A is obtained. In the end face observation, light source 400 may be disposed such that the irradiation position of observation light L2 is on the surface of coating 120A. In the alignment operation, such an observation system is also provided in the device configuration on the near side of second MCF 100B.

In the normal alignment operation, first stage 500A adjusts the posture of first MCF 100A based on the end face observation image obtained as described above so that core 111 of first MCF 100A and core 111 of second MCF 100B coincide with each other. The posture adjustment is performed in the same manner in the device configuration on the near side of second MCF 100B. Thereafter, as shown in the lower stage of FIG. 1, first stage 500A and second stage 500B move first MCF 100A along a movement direction S3*a* parallel to the Z-axis and move second MCF 100B along a movement direction S3*b* parallel to the Z-axis, thereby bringing end face 150A of first MCF 100A and end face 150B of second MCF 100B into contact with each other. In the fusion operation shown in the lower stage of FIG. 1, instead of the observation system placed in the alignment operation, discharge electrodes 600A and 600B are disposed so as to sandwich end face 150A of first MCF 100A and end face 150B of second MCF 100B which are in contact with each other. End face 150A of first MCF 100A and end face 150B of second MCF 100B are fusion-spliced by the discharge between discharge electrodes 600A and 600B.

Figure 2:
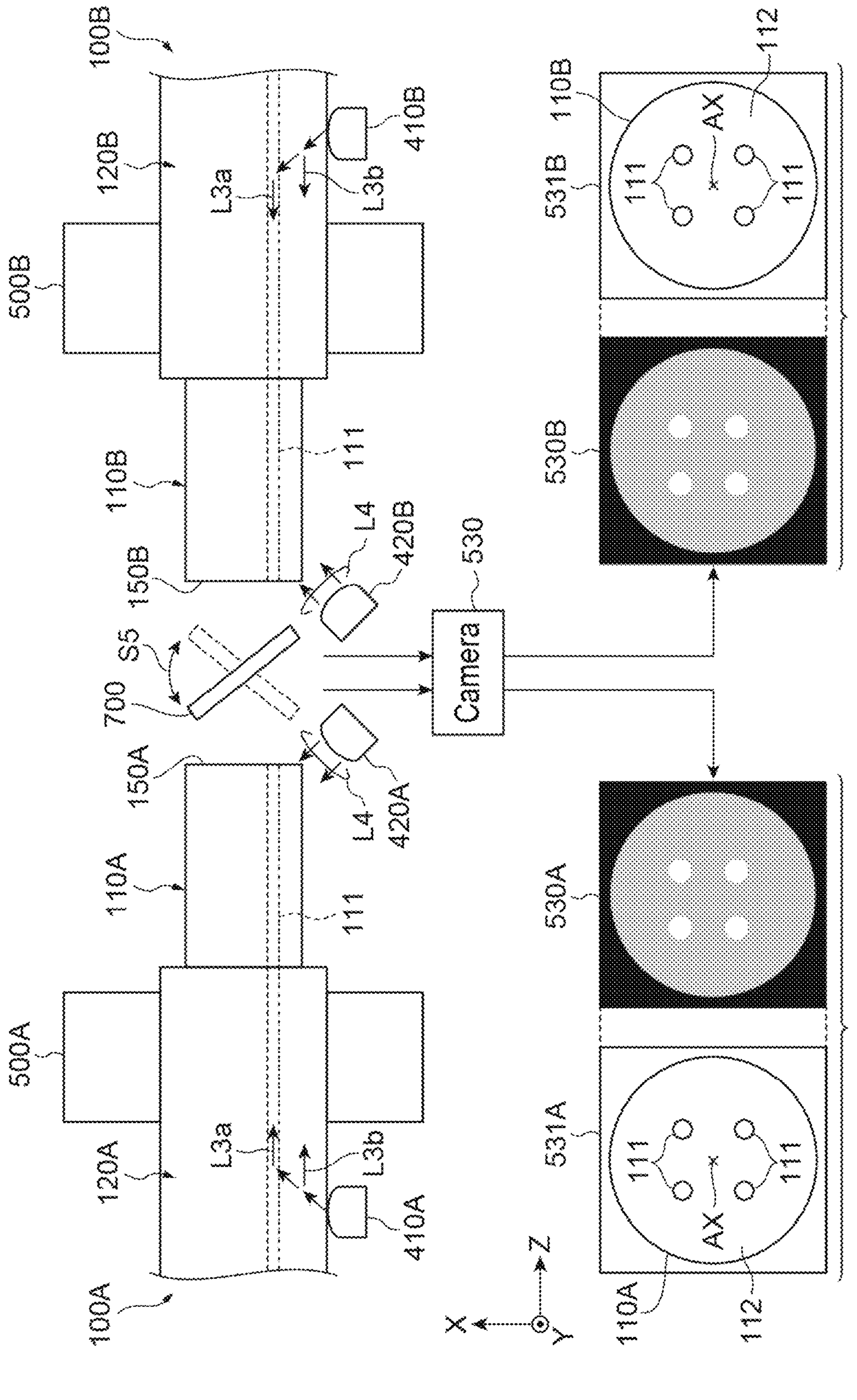
FIG. 2 is a diagram for explaining a device configuration for performing a series of alignment operations and the operation thereof in the fiber fusion splicer and the fiber fusion splicing method of the present disclosure.

FIG. 2 is a diagram for explaining a device configuration for performing a series of alignment operations before a heating step and the operation thereof in the fiber fusion splicer and the fiber fusion splicing method of the present disclosure.

As shown in FIG. 2, the device configuration of the near side of first MCF 100A and the device configuration of the near side of second MCF 100B constitutes the fiber fusion splicer of the present disclosure. In the alignment operation, as a common configuration, a mirror 700 and a camera 530 as an imaging device are disposed between end face 150A of first MCF 100A and end face 150B of second MCF 100B. The angle of mirror 700 is adjusted along a rotation direction S5 between the case where end face 150A of first MCF 100A is captured by camera 530 and the case where end face 150B of second MCF 100B is captured by camera 530. At a position at which mirror 700 is disposed to reflect the observation light from end face 150A of first MCF 100A toward camera 530, camera 530 captures an image 530A of end face 150A of first MCF 100A. It is noted that, a diagram 531A shows the configuration element of image 530A. On the other hand, at a position at which mirror 700 is disposed to reflect the observation light from end face 150B of second MCF 100B toward camera 530, camera 530 captures an image 530B of end face 150B of second MCF 100B. It is noted that, a diagram 531B shows the configuration element of image 530B.

Further, first MCF 100A includes glass optical fiber 110A and coating 120A provided on the outer periphery of glass optical fiber 110A. Glass optical fiber 110A is substantially made of silica glass, and includes a plurality of cores 111 and common cladding 112 surrounding the plurality of cores 111, as shown in the upper stage of FIG. 1. In addition, in first MCF 100A, a portion of coating 120A is removed so that a tip portion of glass optical fiber 110A including end face 150A is exposed. Similarly, second MCF 100B includes glass optical fiber 110B and coating 120B provided on the outer periphery of glass optical fiber 110B. Glass optical fiber 110B is substantially made of silica glass, and includes a plurality of cores 111 and common cladding 112 surrounding the plurality of cores 111, as shown in the upper stage of FIG. 1. In second MCF 100B, coating 120B is partially removed so that a tip portion of glass optical fiber 110B including end face 150B is exposed.

A fiber fusion splicer of the present disclosure includes a driving mechanism, an imaging device, a first illumination device, a second illumination device, and a heating device. The driving mechanism includes first stage 500A and second stage 500B. As shown in the upper stage of FIG. 1, first stage 500A defines the position and rotation angle of end face 150A of first MCF 100A while holding first MCF 100A. Second stage 500B defines the position and the rotation angle of end face 150B of second MCF 100B while holding second MCF 100B. The imaging device includes camera 530 and captures image 530A of end face 150A of first MCF 100A and image 530B of end face 150B of second MCF 100B. In the fiber fusion splicing method of the present disclosure, as a preparation step, first MCF 100A is placed on first stage 500A, and second MCF 100B is placed on second stage 500B. Subsequently, as a series of alignment operations, a first illumination step, a second illumination step, an imaging step, and an alignment step are performed.

The first illumination device that performs the first illumination step is a device that emits observation light to coating 120A of first MCF 100A and coating 120B of second MCF 100B, and includes a first side irradiation light source 410A and a second side irradiation light source 410B. In the example of FIG. 2, first side irradiation light source 410A is in direct contact with coating 120A of first MCF 100A so as to cause a microbend in coating 120A of first MCF 100A. By generating the microbend, the amount of observation light reaching core 111 and common cladding 112 increases. As a result, the identification of core 111 and common cladding 112 in each of image 530A and image 530B obtained from camera 530 is increased. Under this condition, the observation light emitted from first side irradiation light source 410A is divided into an observation light L3*a* propagating through core 111 and an observation light L3*b* propagating through a common cladding 112, and observation light L3*a* and observation light L3*b* are emitted from end face 150A toward mirror 700. Similarly, second side irradiation light source 410B is also in direct contact with coating 120B of second MCF 100B so as to cause a microbend in coating 120B of second MCF 100B. Under this condition, the observation light emitted from second side irradiation light source 410B is divided into observation light L3*a* propagating through core 111 and observation light L3*b* propagating through common cladding 112, and observation light L3*a* and observation light L3*b* are emitted from end face 150B toward mirror 700.

In fact, observation light L3*a* propagating under a condition confined in core 111 by reflection at the core-cladding interface gives luminance to core 111 in image 530A of end face 150A obtained by camera 530. On the other hand, observation light L3*b* propagating under a condition confined in common cladding 112 by reflection at the interface between common cladding 112 and coating 120A or the outside gives luminance to the common cladding 112 in image 530A of end face 150A obtained by camera 530. However, observation light L3*b* has a large propagation loss due to the influence of coating 120A or the like, compared to observation light L3*a*. Therefore, in image 530A of end face 150A, core 111 is identified by forming a luminance difference between core 111 and common cladding 112. However, when the color of coating 120A is made dark in order to increase the discrimination between the MCFs, the propagation loss of the observation light propagating through common cladding 112 becomes excessive, and the luminance of common cladding 112 becomes too small in image 530A of end face 150A, so that it may be difficult to discriminate common cladding 112 itself. In order to solve such a problem, the fiber fusion splicer and the fiber fusion splicing method of the present disclosure include a second illumination device and a second illumination step, respectively.

The second illumination device that performs the second illumination step is a device that respectively emits observation light for end observation to the tip portion of first MCF 100A and the tip portion of second MCF 100B, and includes a first end irradiation light source 420A and a second end irradiation light source 420B. The tip portion of first MCF 100A is an exposed portion of glass optical fiber 110A from which coating 120A is removed, and the tip portion of second MCF 100B is an exposed portion of glass optical fiber 110B from which coating 120B is removed. In the example of FIG. 2, first end irradiation light source 420A is disposed away from first MCF 100A, and emits an observation light L4 in a non-contact state to the tip portion of first MCF 100A from which coating 120A is partially removed. Observation light L4 propagates through glass optical fiber 110A and is emitted from end face 150A toward mirror 700. Similarly, second end irradiation light source 420B is disposed away from second MCF 100B, and emits observation light L4 in a non-contact state to the tip portion of second MCF 100B from which coating 120B is partially removed. Observation light L4 propagates through glass optical fiber 110B and is emitted from end face 150B toward mirror 700. That is, observation light L4 is reflected by the end faces of core 111 and common cladding 112 and the side surface of common cladding 112, and then emitted from end face 150A, and gives luminance to core 111 and common cladding 112 in image 530A of end face 150A obtained by camera 530. As a result, by using first side irradiation light source 410A and second side irradiation light source 410B and using first end irradiation light source 420A and second end irradiation light source 420B, it is possible to provide sufficient luminance to core 111 and common cladding 112 and to provide a difference in luminance between core 111 and common cladding 112. That is, core 111 and common cladding 112 can be identified. By the configuration in which first end irradiation light source 420A and second end irradiation light source 420B of the second illumination device are in the non-contact state with respect to first MCF 100A and second MCF 100B which are fusion spliced, it is possible to prevent the connection strength from being reduced due to damage or contamination in the tip portions of first MCF 100A and second MCF 100B from which coating 120A and coating 120B are removed, respectively.

In the imaging step, image 530A of end face 150A is obtained based on observation lights L3*a*, L3*b*, and L4 that have reached camera 530 from end face 150A of first MCF 100A via mirror 700. Similarly, image 530B of end face 150B is obtained based on observation lights L3*a*, L3*b*, and L4 that have reached camera 530 from end face 150B of second MCF 100B via mirror 700. In the alignment step, first stage 500A and second stage 500B adjust the position and the rotation angle of end face 150A of first MCF 100A and end face 150B of second MCF 100B so that the core positions of images 530A and 530B captured by camera 530 match each other. It is noted that, in order to improve the detection accuracy of the position and the rotation direction of first MCF 100A and second MCF 100B, another camera capable of capturing a side image of first MCF 100A and second MCF 100B may be disposed.

In the first illumination step, the second illumination step, and the imaging step described above, core 111 and common cladding 112 are identified, and in the alignment step, the positions and the rotation directions of first MCF 100A and second MCF 100B are adjusted. Thereafter, after mirror 700 is retracted together with all the light sources 410A, 410B, 420A, and 420B, discharge electrodes 600A and 600B included in the heating device are arranged under a condition where end face 150A of first MCF 100A and end face 150B of second MCF 100B are butted against each other.

In addition, the fiber fusion splicer of the present disclosure in the fusing operation includes a heating device, and the heating device includes discharge electrodes 600A and 600B as shown in the lower stage of FIG. 1. In the heating step, discharge is started between discharge electrodes 600A and 600B, and thus the vicinity of the end faces of first MCF 100A and second MCF 100B is melted, and end face 150A and end face 150B are fusion-spliced.

Figure 3:
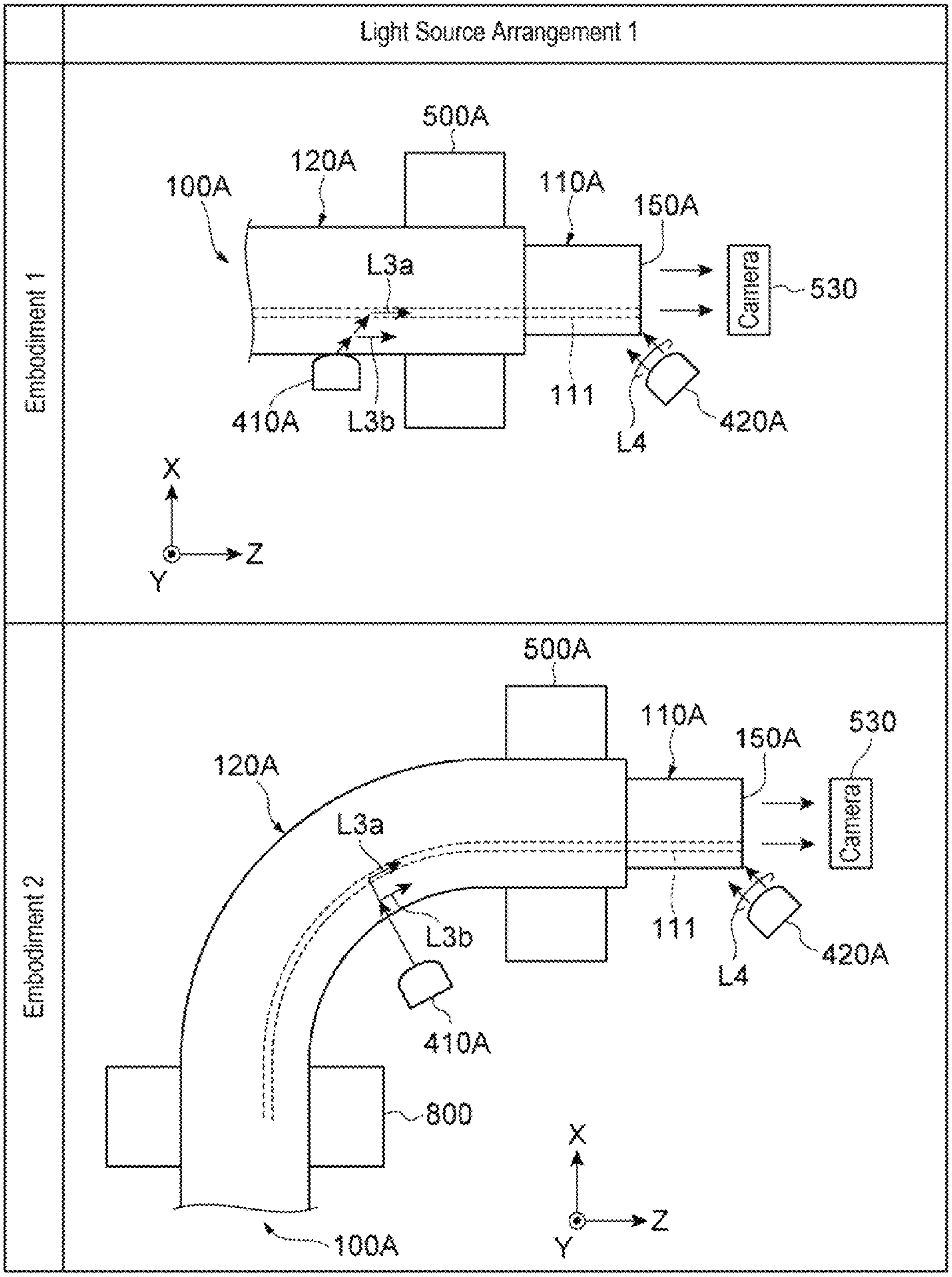
FIG. 3 is a diagram for explaining various light source arrangements applicable to the fiber fusion splicer and the fiber fusion splicing method of the present disclosure.

FIG. 3 is a diagram for explaining various light source arrangements applicable to the fiber fusion splicer and the fiber fusion splicing method of the present disclosure (referred to as “light source arrangement 1” in FIG. 3). In the upper stage of FIG. 3 (referred to as “embodiment 1” in FIG. 3), a light source arrangement is shown in which first side irradiation light source 410A is disposed so as to directly contact coating 120A of first MCF 100A. The lower stage of FIG. 3 (referred to as “embodiment 2” in FIG. 3) shows a light source arrangement in which first side irradiation light source 410A is placed at a position away from a section of coating 120A of first MCF 100A where a bend is formed.

In the upper stage of FIG. 3, the device configuration on the near side of first MCF 100A is shown as the device configuration of the embodiment 1. Since the device configuration on the near side of first MCF 100A and the device configuration on the near side of second MCF 100B are the same, only the device configuration on the near side of first MCF 100A is shown in the upper stage of FIG. 3. In the first illumination device applied to the device configuration of the embodiment 1, first side irradiation light source 410A is disposed to come into contact with first MCF 100A with a microbend occurring in coating 120A of first MCF 100A. Similarly, second side irradiation light source 410B is also disposed to come into contact with second MCF 100B with a microbend formed in coating 120B of second MCF 100B. In this configuration, the observation light introduced from first side irradiation light source 410A to glass optical fiber 110A through coating 120A is divided into observation light L3*a* propagating in core 111 and observation light L3*b* propagating in common cladding 112, and observation light L3*a* and observation light L3*b* are emitted from end face 150A toward camera 530. Such behavior of the observation light is the same in the device configuration on the near side of second MCF 100B.

In the lower stage of FIG. 3, the device configuration on the near side of first MCF 100A is shown as the device configuration of the embodiment 2. Since the device configuration on the near side of first MCF 100A and the device configuration on the near side of second MCF 100B are the same, only the device configuration on the near side of first MCF 100A is shown in the lower stage of FIG. 3. In the device configuration of the embodiment 2, a bending stage 800 is provided as a first bending stage to form a bend in a section covered with coating 120A of first MCF 100A. Similarly, in the case of second MCF 100B, a bending stage is provided as a second bending stage. Thus, the bending state of first MCF 100A and second MCF 100B is maintained.

For first MCF 100A in which the bending is formed as described above, first side irradiation light source 410A of the first illumination device is disposed away from coating 120A of first MCF 100A, and emits side observation light to the section of first MCF 100A in which the bending is formed in a non-contact state. This configuration is the same as the device configuration on the near side of second MCF 100B. The observation light introduced from first side irradiation light source 410A to glass optical fiber 110A via coating 120A is divided into observation light L3*a* propagating in core 111 and observation light L3*b* propagating in common cladding 112, and observation light L3*a* and observation light L3*b* are emitted from end face 150A toward camera 530.

In the device configuration disclosed in both the upper stage and the lower stage of FIG. 3, the second illumination device includes first end irradiation light source 420A and second end irradiation light source 420B for irradiating the tip portion of exposed glass optical fiber 110A and the tip portion of exposed glass optical fiber 110B with observation light for end observation. Since the device configuration on the near side of first MCF 100A and the device configuration on the near side of second MCF 100B are the same, only the device configuration on the near side of first MCF 100A is shown in the lower stage of FIG. 3. First end irradiation light source 420A is disposed away from first MCF 100A and emits observation light L4 to the tip portion of first MCF 100A from which coating 120A is partially removed in a non-contact state. Observation light L4 propagates through glass optical fiber 110A and is emitted from end face 150A toward camera 530. Similarly, second end irradiation light source 420B is disposed away from second MCF 100B, and emits observation light L4 in a non-contact state to the tip portion of second MCF 100B from which coating 120B is partially removed. Observation light L4 propagates through glass optical fiber 110B and is emitted from end face 150B toward camera 530.

Figure 4:
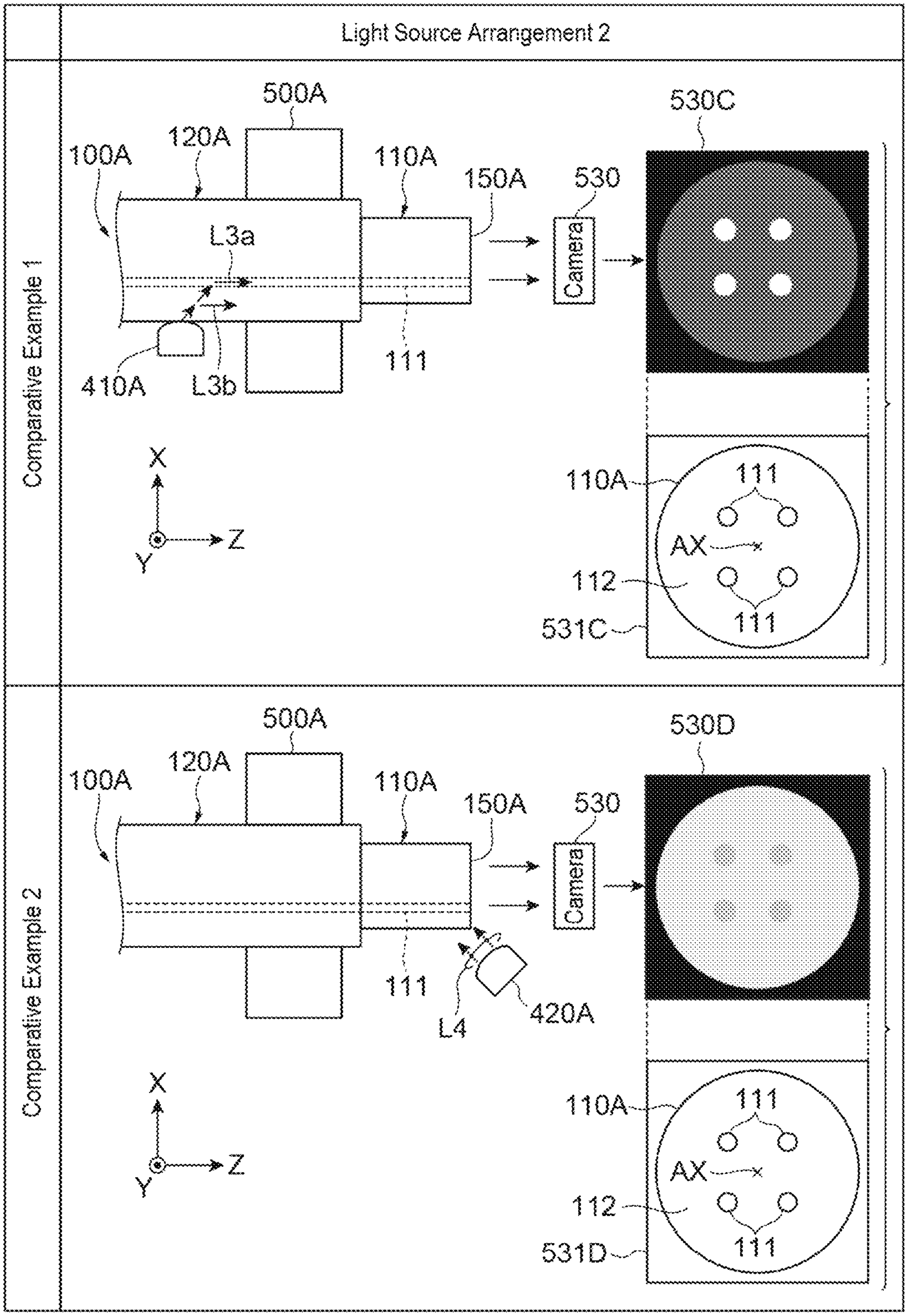
FIG. 4 is a diagram for explaining various light source arrangements as comparative examples of observation light illumination in a series of alignment operations.

FIG. 4 is a diagram for explaining various light source arrangements as comparative examples of observation light illumination in a series of alignment operations (referred to as "light source arrangement 2" in FIG. 4). In the upper stage of FIG. 4 (referred to as "comparative example 1" in FIG. 4), a light source arrangement in which only first side irradiation light source 410A is placed to directly contact coating 120A of first MCF 100A is shown. In the lower stage of FIG. 4 (referred to as "comparative example 2" in FIG. 4), a light source arrangement in which only first end irradiation light source 420A is placed in a non-contact state at the tip portion of glass optical fiber 110A from which coating 120A is partially removed is shown.

The device configuration shown in the upper stage of FIG. 4 as comparative example 1 is the device configuration on the near side of first MCF 100A, and is the same as the device configuration of embodiment 1 shown in the upper stage of FIG. 3 except that first end irradiation light source 420A of the second illumination device is removed. Meanwhile, a device configuration shown in the lower stage of FIG. 4 as comparative example 2 is also a device configuration on the near side of first MCF 100A, and is the same as the device configuration of embodiment 1 shown in the upper stage of FIG. 3 except that first side irradiation light source 410A of the first illumination device is removed.

In the device configuration of comparative example 1 shown in the upper stage of FIG. 4, an image 530C of end face 150A is obtained from camera 530. The diagram indicated by a reference sign 531C in the upper stage of FIG. 4 is a diagram of image 530C. In image 530C, that is, a diagram 531C, core 111 and common cladding 112 arranged on end face 150A of glass optical fiber 110A are displayed. As can be seen from obtained image 530C, in the device configuration in which the observation light, specifically observation light L3*a* and observation light L3*b*, is emitted only from first side irradiation light source 410A, the luminance difference between core 111 and common cladding 112 increases, but the luminance difference between common cladding 112 and the background decreases, and when the coating is colored dark, the luminance difference is completely eliminated. In this case, it is difficult to specify the shape of common cladding 112. That is, in the light source arrangement shown in the upper stage of FIG. 4, the observation light emitted from end face 150A of first MCF 100A includes only observation light L3*a* and observation light L3*b* derived from the side illumination. In general, in an MCF in which the propagation loss of the observation light in the common cladding is large, such as a case where the coating is colored, the luminance of the common cladding is excessively small, and it is difficult to identify the common cladding in the image of the end face, not limited to first MCF 100A.

On the other hand, in the device configuration of comparative example 2 shown in the lower stage of FIG. 4, an image 530D of end face 150A is obtained from camera 530. The diagram indicated by a reference sign 531D is a diagram of image 530D. In image 530D, that is, a diagram 531D, core 111 and common cladding 112 arranged on end face 150A of glass optical fiber 110A are displayed. As can be seen from obtained image 530D, in the device configuration in which observation light L4 is emitted only from first end irradiation light source 420A, the luminance difference between common cladding 112 and the background increases, but the luminance difference between core 111 and common cladding 112 decreases. In this case, it is difficult to specify the position and shape of core 111 in common cladding 112. That is, in the light source arrangement shown in the lower stage of FIG. 4, the observation light emitted from end face 150A of first MCF 100A includes only observation light L4 derived from the end illumination. In general, in the MCF, a luminance difference is not formed between the common cladding and the core, or the core has lower luminance depending on the light source arrangement, not limited to first MCF 100A. Therefore, it is difficult to identify the core in the image of the end face.

Figure 5:
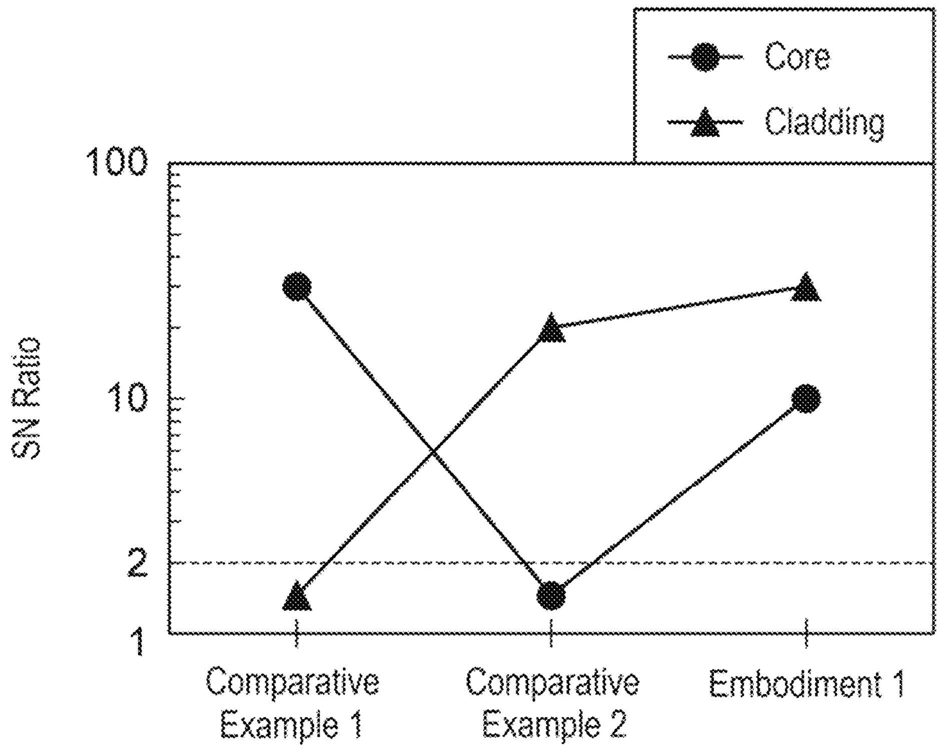
FIG. 5 is a graph showing changes in SN ratio for the light source arrangement (embodiment 1) of the present disclosure and the light source arrangement according to the comparative example.

FIG. 5 is a graph showing the change in the SN ratio for the light source arrangement of the present disclosure and the light source arrangement according to the comparative example. Specifically, FIG. 5 is a graph showing the core SN ratio and the cladding SN ratio of image 530A (embodiment 1 shown in the upper stage of FIG. 3), image 530C (comparative example 1 shown in the upper stage of FIG. 4), and image 530D (comparative example 2 shown in the lower stage of FIG. 4) of end face 150A obtained by camera 530. Note that image 530A is the image of embodiment 1 shown in the upper stage of FIG. 3, image 530C is the image of comparative example 1 shown in the upper stage of FIG. 4, and image 530D is the image of comparative example 2 shown in the lower stage of FIG. 4. In FIG. 5, the symbol "●" indicates the SN ratio of core 111 to common cladding 112, that is, the core SN ratio, and the symbol "▲" indicates the SN ratio of common cladding 112 to the background, that is, the cladding SN ratio. In FIG. 5, the plotted core SN ratio and cladding SN ratio are connected by solid lines, but these solid lines are merely auxiliary lines for visually identifying the core SN ratio and cladding SN ratio among comparative example 1, comparative example 2, and embodiment 1. Therefore, these solid lines, which are auxiliary lines, are not indicators indicating the core SN ratio and the cladding SN ratio.

In the following description, the luminance average values of core 111, common cladding 112, and the background are referred to as "core luminance", "cladding luminance", and "background luminance", respectively. The standard deviations of the luminance variations with time in core 111, common cladding 112, and the background are referred to as "core luminance noise", "cladding luminance noise", and "background luminance noise", respectively.

Specifically, the core SN ratio is calculated by the following formula (1):

$$\text{Core } SN \text{ ratio} = A1/B1 \tag{1}$$

A1="core luminance"−"cladding luminance"

B1="core luminance noise"+"cladding luminance noise"

The cladding SN ratio is calculated by the following formula (2):

$$\text{Cladding } SN \text{ ratio} = A2/B2 \tag{2}$$

A2="cladding luminance"−"background luminance"

B2="cladding luminance noise"+"background luminance noise"

As can be seen from the graph of FIG. 5, in comparative example 1, the cladding SN ratio is reduced due to the reduction in the luminance of common cladding 112. In detail, in the case of comparative example 1, the cladding SN ratio is two or less. In comparative example 2, the core SN ratio is low because the luminance difference between core 111 and common cladding 112 is small. Specifically, in the case of the comparative example 2, the core SN ratio is two or less. In general, when the SN ratio is less than three, core 111 and common cladding 112 cannot be identified, or even when they can be identified, the measurement error of the position becomes large. That is, the possibility of an increase in splice loss after fusion is increased. In contrast, in the first embodiment, both the core SN ratio and the cladding SN ratio are 10 or more, and core 111 and common cladding 112 can be easily identified.

REFERENCE SIGNS LIST

100A first MCF
100B second MCF
110A, 110B glass optical fiber (glass portion)
120A, 120B coating
150A, 150B end face
111 core
112 common cladding
400 light source
410A first side irradiation light source
410B second side irradiation light source
420A first end irradiation light source
420B second end irradiation light source
500A first stage
500B second stage
510, 520, 530 camera
530A, 530B, 530C, 530D image
531A, 531B, 531C, 531D diagram
600A, 600B discharge electrode
700 mirror
800 bending stage
AX central axis
L1 L2 observation light
L3*a* L3*b* L4 observation light
S1 S2 S3*a* S3*b* movement direction
S4 S5 rotation direction

The invention claimed is:

1. A fiber fusion splicer for fusion splicing first and second multi-core optical fibers each having a glass portion and a coating surrounding an outer periphery of the glass portion, the glass portion having a plurality of cores and a common cladding surrounding the plurality of cores, the coating of each of the first and second multi-core optical fibers being partially removed to expose a tip portion of the glass portion including an end face, the fiber fusion splicer comprising:

a driving mechanism including a first stage and a second stage, the first stage defining a position and a rotation angle of the end face of the first multi-core optical fiber while holding the first multi-core optical fiber, the second stage defining a position and a rotation angle of the end face of the second multi-core optical fiber while holding the second multi-core optical fiber;

an imaging device configured to capture an image of each of the end faces of the first and second multi-core optical fibers;

a first illumination device including a first side irradiation light source configured to emit first side observation light to the coating of the first multi-core optical fiber, and a second side irradiation light source configured to emit second side observation light to the coating of the second multi-core optical fiber;

a second illumination device including a first end irradiation light source and a second end irradiation light source, the first end irradiation light source being disposed away from the first multi-core optical fiber and configured to emit first end observation light to the tip portion of the first multi-core optical fiber from which the coating is partially removed, the second end irradiation light source being disposed away from the second multi-core optical fiber and configured to emit second end observation light to the tip portion of the second multi-core optical fiber from which the coating is partially removed; and a heating device configured to heat the end faces of the first and second multi-core optical fibers to melt the end faces of the first and second multi-core optical fibers with the end faces of the first and second multi-core optical fibers butted against each other.

2. The fiber fusion splicer according to claim 1, wherein in the first illumination device, the first side irradiation light source is disposed to come into contact with the first multi-core optical fiber with a microbend occurring in the coating of the first multi-core optical fiber, and the second side irradiation light source is disposed to come into contact with the second multi-core optical fiber with a microbend occurring in the coating of the second multi-core optical fiber.

3. The fiber fusion splicer according to claim 1, wherein the driving mechanism further includes a first bending stage and a second bending stage, the first bending stage being configured to form a bend in a section of the first multi-core optical fiber, the section being covered with the coating of the first multi-core optical fiber, the second bending stage being configured to form a bend in a section of the second multi-core optical fiber, the section being covered with the coating of the second multi-core optical fiber, and in the first illumination device, the first side irradiation light source is disposed away from the first multi-core optical fiber to emit the first side observation light to the section of the first multi-core optical fiber in which the bend is formed, and the second side irradiation light source is disposed away from the second multi-core optical fiber to emit the second side observation light to the section of the second multi-core optical fiber in which the bend is formed.

4. A fiber fusion splicing method for fusion splicing first and second multi-core optical fibers each having a glass portion and a coating surrounding an outer periphery of the glass portion, the glass portion having a plurality of cores and a common cladding surrounding the plurality of cores, the coating of each of the first and second multi-core optical fibers being partially removed to expose a tip portion of the glass portion including an end face, the fiber fusion splicing method comprising:

a preparation step of placing the first multi-core optical fiber on a first stage defining a position and a rotation angle of the end face of the first multi-core optical fiber, and placing the second multi-core optical fiber on a second stage defining a position and a rotation angle of the end face of the second multi-core optical fiber;

a first illumination step of irradiating the coating of the first multi-core optical fiber with first side observation light from a first side irradiation light source, and irradiating the coating of the second multi-core optical fiber with second side observation light from a second side irradiation light source;

a second illumination step of irradiating the tip portion of the first multi-core optical fiber from which the coating is partially removed with first end observation light from a first end irradiation light source disposed away from the first multi-core optical fiber, and irradiating the tip portion of the second multi-core optical fiber from which the coating is partially removed with second end observation light from a second end irradiation light source disposed away from the second multi-core optical fiber;

an imaging step of capturing an image of each of the end faces of the first and second multi-core optical fibers;

an alignment step of adjusting the positions and the rotation angles of the end faces of the first and second multi-core optical fibers to make positions of the plurality of cores in the captured image of the end face of the first multi-core optical fiber match positions of the plurality of cores in the captured image of the end face of the second multi-core optical fibers; and a heating step of heating the end faces of the first and second multi-core optical fibers to melt the end faces of the first and second multi-core optical fibers with the end faces of the aligned first and second multi-core optical fibers butted against each other.

5. The fiber fusion splicing method according to claim 4, wherein in the first illumination step, the first side irradiation light source is disposed to come into contact with the first multi-core optical fiber with a microbend occurring in the coating of the first multi-core optical fiber, and the second side irradiation light source is disposed to come into contact with the second multi-core optical fiber with a microbend occurring in the coating of the second multi-core optical fiber.

6. The fiber fusion splicing method according to claim 4, wherein in the first illumination step, the first side irradiation light source is disposed away from the first multi-core optical fiber and emits the first side observation light to a section of the coating of the first multi-core optical fiber in which a bend is formed, and the second side irradiation light source is disposed away from the second multi-core optical fiber and emits the second side observation light to a section of the coating of the second multi-core optical fiber in which a bend is formed.

* * * * *